US012743255B2

(12) United States Patent
Petty

(10) Patent No.: US 12,743,255 B2
(45) Date of Patent: Sep. 22, 2026

(54) VISUAL CODING SYSTEM AND METHOD OF USE

(71) Applicant: Tap that App LLC, St. Joseph, MO (US)

(72) Inventor: Jason M. Petty, Kansas City, MO (US)

(73) Assignee: Tap That App LLC, St. Joseph, MO (US)

(*) Notice: Subject to any disclaimer, the term of this patent is extended or adjusted under 35 U.S.C. 154(b) by 231 days.

(21) Appl. No.: 18/438,873

(22) Filed: Feb. 12, 2024

(65) Prior Publication Data

US 2024/0272878 A1 Aug. 15, 2024

Related U.S. Application Data

(60) Provisional application No. 63/444,810, filed on Feb. 10, 2023.

(51) Int. Cl.
*G06F 8/34* (2018.01)

(52) U.S. Cl.
CPC .................................... *G06F 8/34* (2013.01)

(58) Field of Classification Search
CPC ........................................................ G06F 8/34
See application file for complete search history.

(56) References Cited

U.S. PATENT DOCUMENTS 6,912,719 B2 * 6/2005 Elderon .................. G06F 9/541 707/E17.032
7,500,224 B2 * 3/2009 Hejlsberg .................. G06F 8/51 717/137
9,916,134 B2 * 3/2018 Charisius .................. G06F 8/20
12,014,160 B2 * 6/2024 Singh ........................ G06F 8/73
2005/0283758 A1 * 12/2005 Cobcroft .................. G06F 8/38 717/113
2006/0212845 A1 * 9/2006 Davidson .............. F03D 3/0418 717/109
2009/0125892 A1 * 5/2009 Crewdson ................ G06F 8/70 717/136
2009/0235188 A1 * 9/2009 Rinaudo .................. G06F 8/34 715/762

(Continued)

FOREIGN PATENT DOCUMENTS

JP 2004133630 A * 4/2004

*Primary Examiner* — Phillip H Nguyen
(74) *Attorney, Agent, or Firm* — AVEK IP, LLC; Christopher M. DeBAcker

(57) ABSTRACT

A tag-based coding language and toolkit for providing a visual coding environment that allows conversion easily between programming languages. A visual layer is provided which minimizes the need for typing actual code. Files are imported and associated with pictures. Built-in translators convert existing language specific code into a neutral language associated with the present invention. This converted code functions as a blueprint for building additional programs. The pictures can be added or removed from these generated blueprints. These pictures do nothing to the function of the code, they are simply for providing a visual element associated with the blueprint piece of code used for building a complete program. A barcode system could be employed to provide an inventory of the blueprints and associated pictures. The inventory creates the barcode automatically for each part that is generated by the software program.

10 Claims, 10 Drawing Sheets

(56) References Cited

U.S. PATENT DOCUMENTS

| | | | | |
|---|---|---|---|---|
| 2023/0325164 | A1* | 10/2023 | Singh | G06F 8/51<br>717/137 |
| 2024/0086157 | A1* | 3/2024 | Patil | G06F 8/34 |

* cited by examiner

2

Original Program Software Code In Language X 8

Programmer Computer With Software Application Including Language Database and Translation Functions 4

New Program Software Code In Language Y, Containing Original Program in Language X as Frozen Blueprint 34

VISUAL CODING SYSTEM AND METHOD OF USE

CROSS-REFERENCE TO RELATED APPLICATION

This application claims priority in U.S. Provisional Patent Application No. 63/444,810 Filed Feb. 10, 2024, which is incorporated herein by reference.

BACKGROUND OF THE INVENTION

1. Field of the Invention

The present invention relates generally to a coding system and method for use thereof, and more specifically to a visual coding system capable of converting between languages.

2. Description of the Related Art

Visual coding environments exist today using language specific systems. Existing systems target a specific language or environment. The problem to be solved is to develop a new visual programming language and tools that will be the standardized rules and methods upon which to develop visual environments, with the result of programming visually using pictures to remove the need of programming by typing. It is desirable to minimize the amount of source code typed.

What is desired is to end typing source code. Currently, the existing systems fail to solve this problem for many reasons. All the languages are independent and owned by different owners. No current standardized rules and methods have been established. The visual environments all operate and modify source code in many ways. They also use the programming specific language. As the languages change, so must their visual environment change, not to mention the complexity of changes when handling multiple languages. The task of removing typing source code as a system of programming is currently very difficult.

Heretofore there has not been available a system or method for a visual coding system with the advantages and features of the present invention.

BRIEF SUMMARY OF THE INVENTION

The present invention generally provides a tag-based coding language and toolkit for providing a visual coding environment that allows conversion easily between programming languages. A visual layer is provided which minimizes the need for typing actual code. Files are imported and associated with pictures. An inventory can be constructed from these pictures, and packets can be generated which can be exported as fully functional programs.

Built-in translators convert existing language specific code into a neutral language associated with the present invention. This converted code functions as a blueprint for building additional programs. Blueprints represent source code in a functionally frozen state, and is usable as a version control tool.

Pictures can be added or removed from these generated blueprints. These pictures do nothing to the function of the code, they are simply for providing a visual element associated with the blueprint piece of code used for building a complete program. When referring to a "picture," that can refer to a 2D or 3D image, an icon, a graphic, or anything that can be used as a stand-in for the software element.

A barcode system could be employed to provide an inventory of the blueprints and associated pictures. The inventory creates the barcode automatically for each part that is generated by the software program. These barcodes could then be utilized using any standard barcode inventory management system.

A packet creator function is included. The packet creator extracts parts from the inventory system and stores them in a packet form for use with the developer's visual programming environments.

Language exporter elements allow the present invention o then export a program into a language-specific source code using the translators.

The present invention works adjacent to existing visual environments and existing source code that is created in a preexisting language.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

Figure 1:
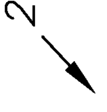
FIG. 1 a simplified diagrammatic representation of a preferred embodiment of the present invention.
Figure 1:
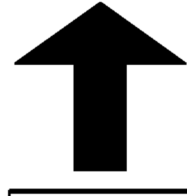
Figure 1:
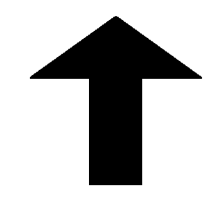

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

If not otherwise defined in the figures or the specification, the abbreviation "SW" refers to "Software." There may be several different pieces of software, and unique descriptors shall be provided to delineate between the several different pieces of software. The proprietary software portion of the present invention is consistently referred to as the "Software Application" and the unique language created for the Software Application is referred to as the "Software Application Language," or as otherwise identified below.

II. Preferred Embodiment Visual Programming Language System 2

The present invention provides a visual programming language system 2 which utilizes a tag-based language, generated from a proprietary software application 12 and its associated toolkit 14 to unlock the power of visual coding environments. It is a set of standardized rules and methods for developing visual coding environments. It is designed to work with any text-based language whether existing or in the future. It uses language translators 16 for language specific source code. A new language, the software application language 20, created by the present invention is a visual language created to handle the complexity of programming in a visual environment. The tools are used to work with the new language.

FIG. 1 shows, in a very general sense, how the visual programming language system 2 takes an original program software code 8, which is in an original software language "X," which could be Java, C Sharp, C++, Python, or any other programming language. This original software code is part of an entire program 6 which may include other assets 10, such as graphics and audio, in addition to the code 8. The program is fed into a computing device 4 used by a programmer which includes the software application 12 capable of translating the code 8 into a new code 34 in a different language "Y," which may be any other language other than the original language "X."

Figure 2:
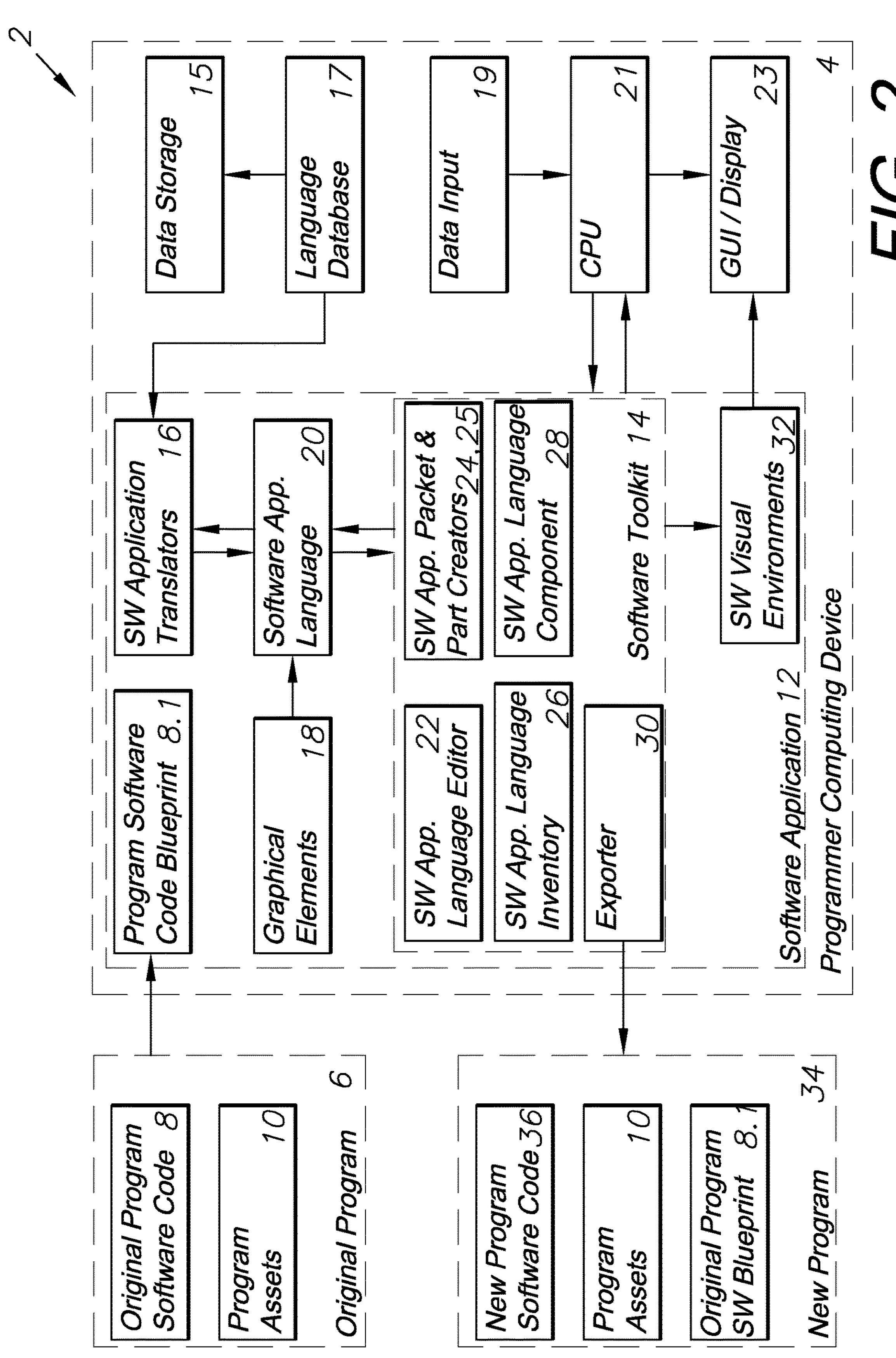
FIG. 2 is a more detailed diagrammatic representation thereof.

FIG. 2 shows this system 2 in with additional detail. Generally, the visual programming language system 2 involves taking an existing, original program 6 which has program software code 8 and associated program assets 10, such as sounds, graphics, and other elements that aren't the core program software code 8, and translating that code 8 from the original program 6 into a new program 34 with new program software code 36, while also carrying the assets 10 into the new program 34.

A programmer computing device 4, which could be any standard personal computer, latptop computer, tablet computer, or any computing device capable of running the necessary software application 12 while having a data storage 15, data input 19, such as keyboard, mouse, etc., a CPU 21, and a graphical user interface (GUI) and associated display 23. A language database 17 associated with the software application 12 is stored within the data storage 14, and the CPU instructs the various tasks of the software application 12. A software visual environment 32 allows the software application show itself through the GUI 23.

The software application 12 includes a program software code blueprint 8.1 which is a frozen copy of the original program software code 8 of the original program 6 being translated using the present invention. This blueprint 8.1 will carry through and even be stored within the translated new program 34 at the end of the process. The program software code 8 is then passed through a software application translator 16 which pulls the necessary language from the language database 17 to translate the program software code 8 into a new software application language 20. This is a proprietary new language intended to be used with the software application. If the program software code 8 is written in a first language, the software application language is a second language which is distinguishable from the first language and the final language of the program software code 36, which could be called the third language.

Identifiers, which can included graphical elements 18 such as icons, pictures (2D or 3D), or other elements, even a barcode, are applied to this translated software application 20 as it is edited using the software toolkit 14. The toolkit 14 is for working with the Software Application Language 20. Any suitable way of tagging a piece of the software program code could be an identifier for the purpose of the present invention.

Technically, the software application translators 16 are part of the toolkit, but they are shown distinct in FIG. 2 for simplification. Each language that is used to create source code in the world today will require a translator to translate the language specific source code into software application language 20 source code. For example, if you would like to translate a word processor into the software application language 20, it would require a translator. The translators are what builds the new language based on what the language specific source code does within a page of source code. The Software Code Blueprint 8.1 is a frozen copy of the original page of language specific source code within the software application language 20. A frozen copy means an exact replica of the language specific source code that does not change and contains a timestamp.

The toolkit 14 has a software application language editor 22 for modifying the software application language 20 source code. The toolkit can add and remove the component Graphical Elements 18 from a Blueprint. The Software Language Editor 22 is used to modify the Software Application Language 20 source code based on needs and usage.

The primary tools of the toolkit 14 are the software application Packet Creator 24 and Part Creator 25. The Part Creator 24 finds and displays areas of a Blueprint 8.1 that can be identified and built into a software application language 20 part 38. The developer has the capability to create Language Parts 38. The part creator will look for locations within the Blueprint where Graphical Content 18 exists and allow the developer to create software application language 20 parts 38. The toolkit 14 can also build a barcode 48 for use within an inventory of the language part 38 built.

Whereas the Packet Creator 25 is a subsystem for taking software application language 20 parts 38 and combining them together to form a package of language parts. The Software Application Language Packet 40 is what the Software Visual Environment 32 uses to display graphical content that represents language specific source code to the user of the visual coding environment. The language packet 40 is a collection of language parts 38.

The toolkit further includes a Software Language Inventory 26 which is a subsystem built to inventory the Software Application Language parts 38. As the developer creates parts in the Software Application Language 20, those parts will be assigned a unique barcode 48, and this barcode is how the inventory system maintains and identifies parts to be used in a Software Application Language Packet 40.

A tagged piece of Software Application Language 20 source code with the graphical content attached 18 is used by the toolkit as a Software Language Component 28. This resides within a blueprint 42 made up of Software Application Language 20 code. The Software Application Language Component is ignored during export of a Blueprint when language specific source code is created. It will not affect the frozen state of a Blueprint. The Software Application Language Part Creator 25 assigns a barcode to the Software Application Language Component producing a Software Application Language Part 38. The developer determines what Software Application Language components 28 become Software Application Language parts 38.

The software application 12, using the toolkit 14 and other elements as discussed above, translate the original program 6 into a new program 34, containing the original program software code 8 frozen within it as a program software code blueprint 8.1, while running the new program 34 in the third, translated program software code 36. The same assets 10 from the original program 6 are also brought through into the translated program.

Figure 3:
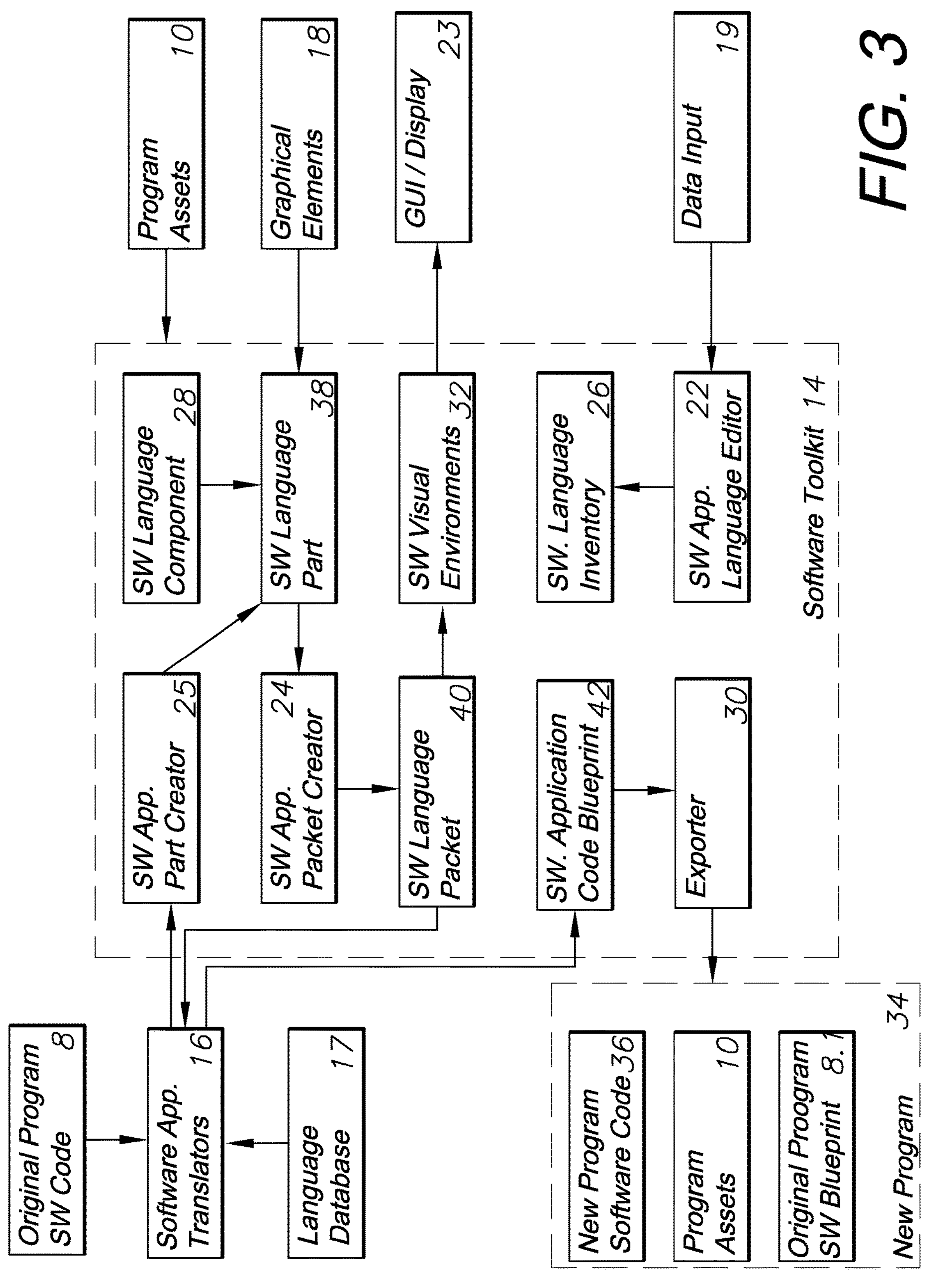
FIG. 3 is a diagrammatic representation of a software toolkit element thereof.

FIG. 3 shows in a bit more detail surrounding the software toolkit 14 and its various components and how they take the original program software code 8 and translate it into the new program 34 software code 36.

Figure 4:
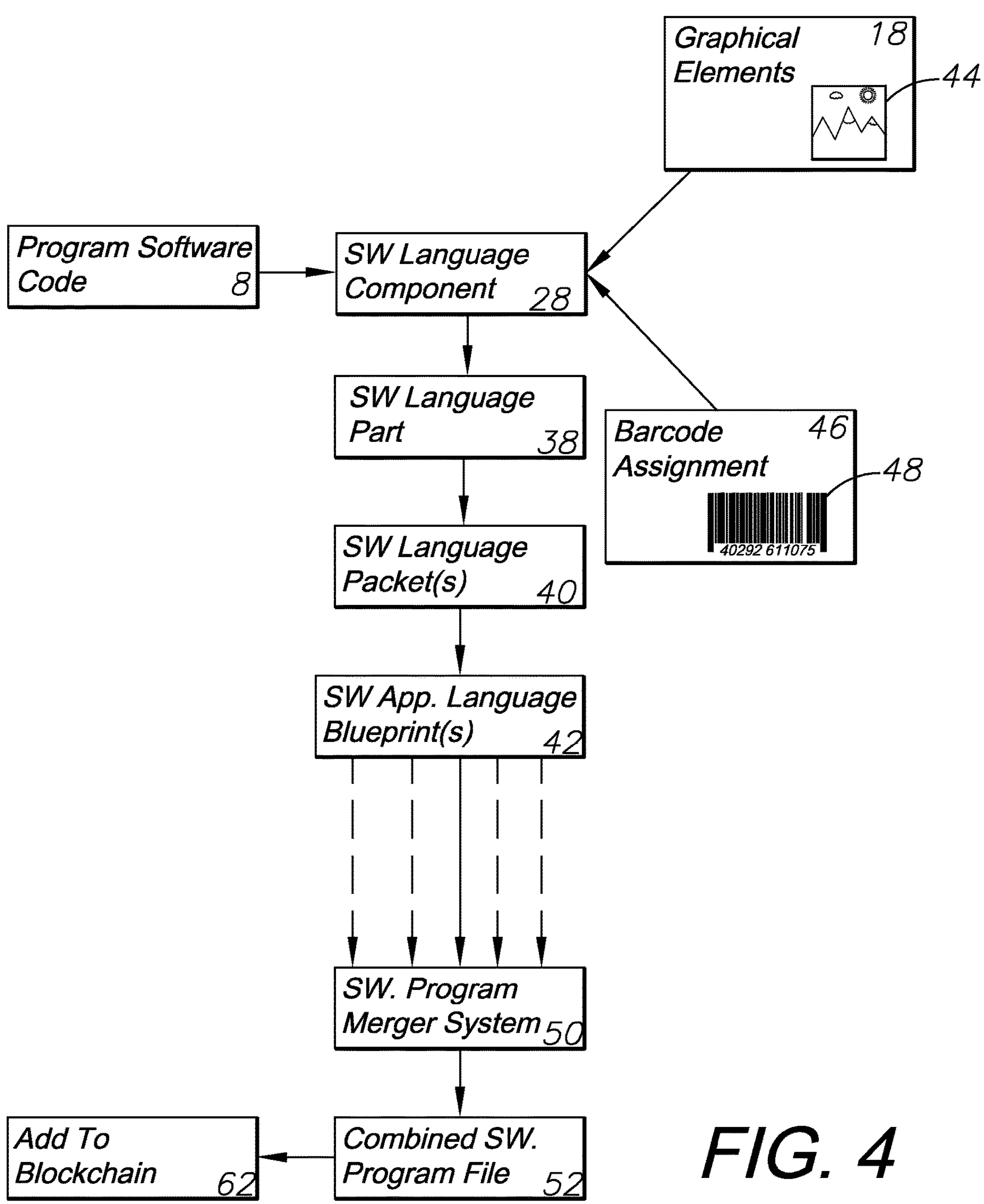
FIG. 4 is a diagrammatic representation of the creation of a software language blueprint element thereof and optional inclusion of blockchain elements.

FIG. 4 shows diametrically how the identifiers, here shown as graphical elements 18 which may include an image 44, icon, avatar, or any element usable to sort the component 28, and/or a barcode assignment 46 which can assign a barcode 48, can be tagged and affixed to the software language component 28. This flows into the packet 40 and into the software program code blueprint 42. A merger system 50 within the present invention could further combine these blueprints into a combined software program file 52. This merger system 50 is capable of merging multiple Software Application Blueprints into one single file. The merger system is used to create one single file to represent software application language source code in a way that can utilize block chain technology 62 to secure the software application language source code. This allows accurate and simple validation that the software application language source code has not been modified.

Figure 5:
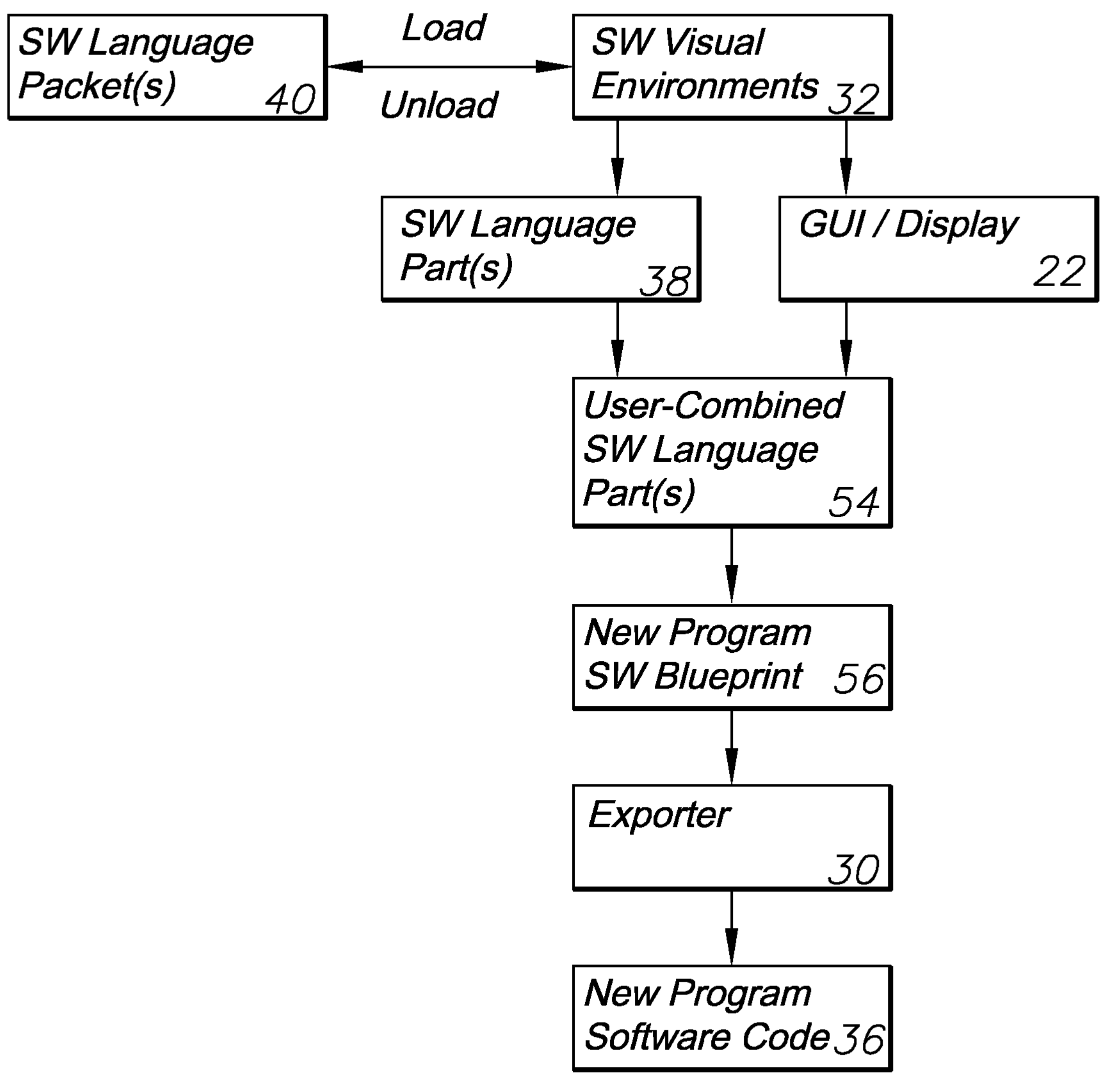
FIG. 5 is a diagrammatic representation of creating a translated software code with user input.

FIG. 5 diagrams how a user can use the software application's visual environments 32 to edit the software language parts 38, while viewing the GUI 23, to create user-combined software language parts 54. The software language packets 40 are loaded and unloaded into the GUI such that the software language parts 38 can be edited and combined by the user into the new program software blueprint 56 which is then exported through the exporter 30 into the new program software code 36.

Figure 6:
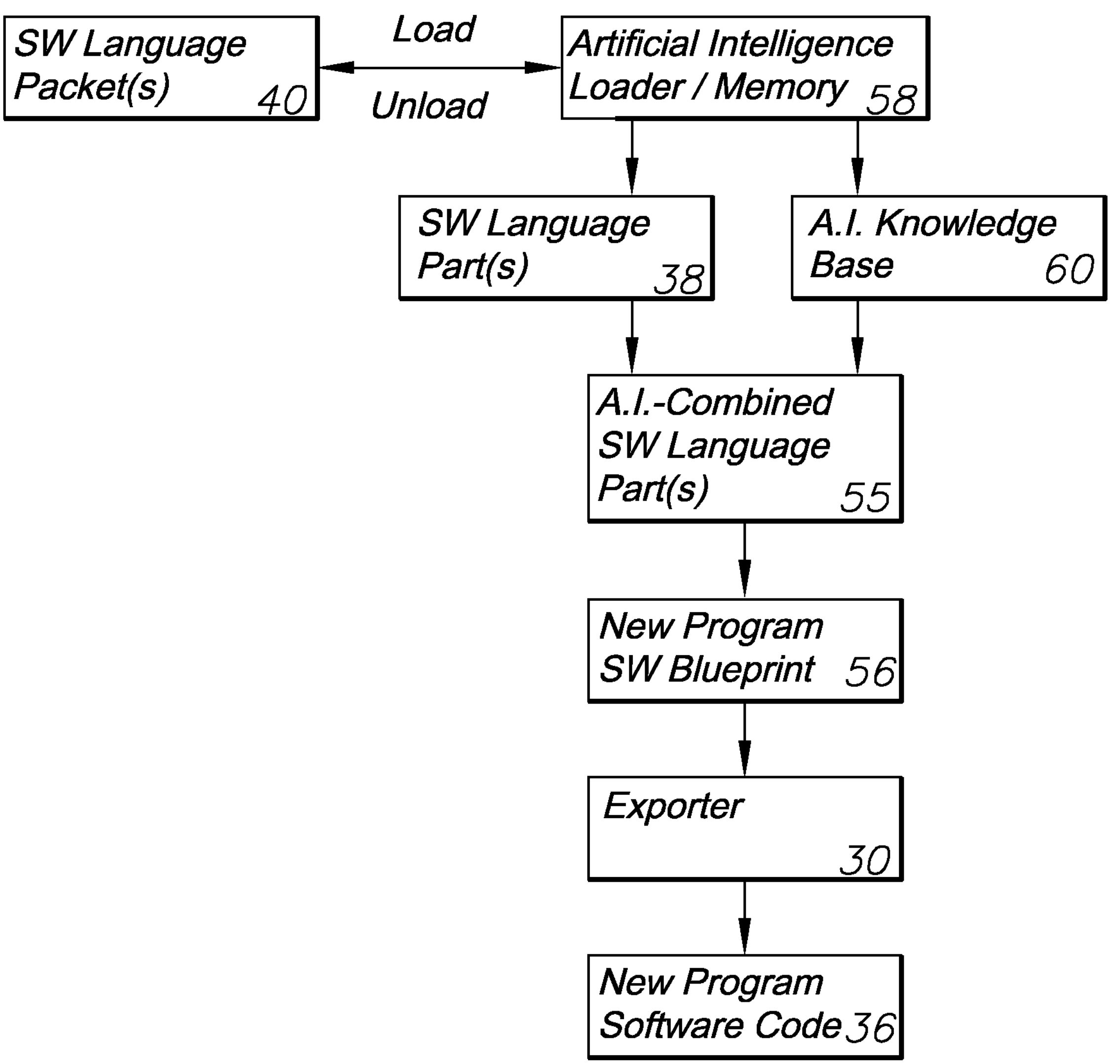
FIG. 6 is a diagrammatic representation thereof using artificial intelligence input.

FIG. 6 similarly diagrams how an artificial intelligence ("A.I.") could instead use the software application to translate software code. An artificial intelligence loader/memory 58 element takes the software application language parts 38 from the software application language packets 40 and uses an A.I. Knowledge Base 60 to create an A.I.-Combined Software Language Parts 55 which are combined into the new program software blueprint 56, which is then exported through the exporter 30 into a new program software code 36.

Figure 7:
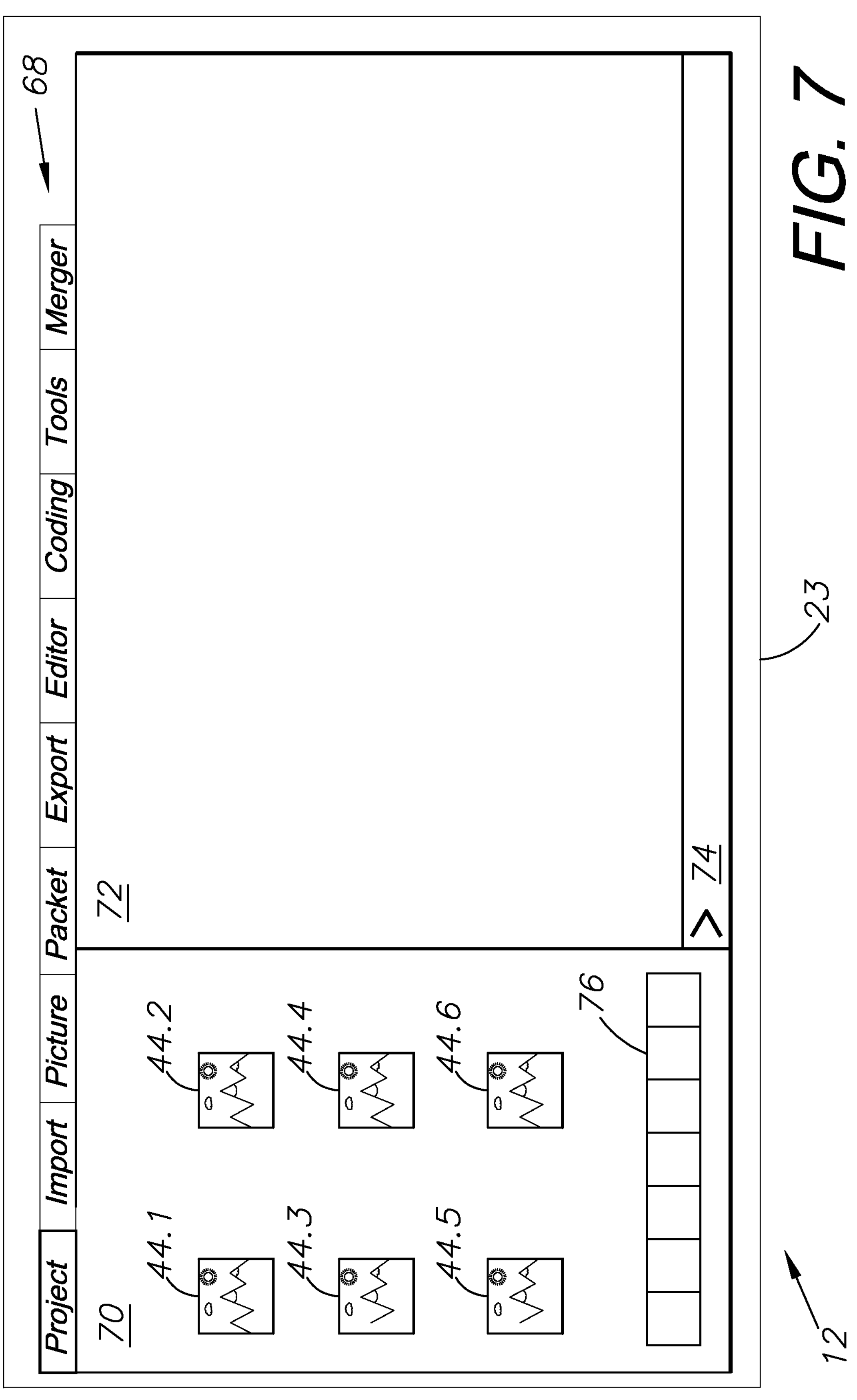
FIG. 7 is a diagrammatic representation of a typical user interface thereof.

FIG. 7 shows how a sample GUI 23 may display the software application 12 on a monitor or other display type. A toolbar 68 at the top of the GUI allows the user to move through various menu options which allow the user to edit the software application language 20 as it is imported from an original program 6 and allows the translation and export of the new software program 34. A left window 70 allows the user to program visually using the identifier images 44.1, 44.2, 44.4, 44.4, 44.5, and 44.6, each of which are associated with various software application language packets 40 and/or parts 38. The identifiers shown as images 44.1-44.6 can be dragged into the slots 76 at the bottom of the window 70 to build the desired final program. This provides at least one example of a graphical interface for a user to program in.

The right window 72 would display the source code in the software application language 20, and the command bar 74 below allows the user to input text corrections into the code.

Figure 8A:
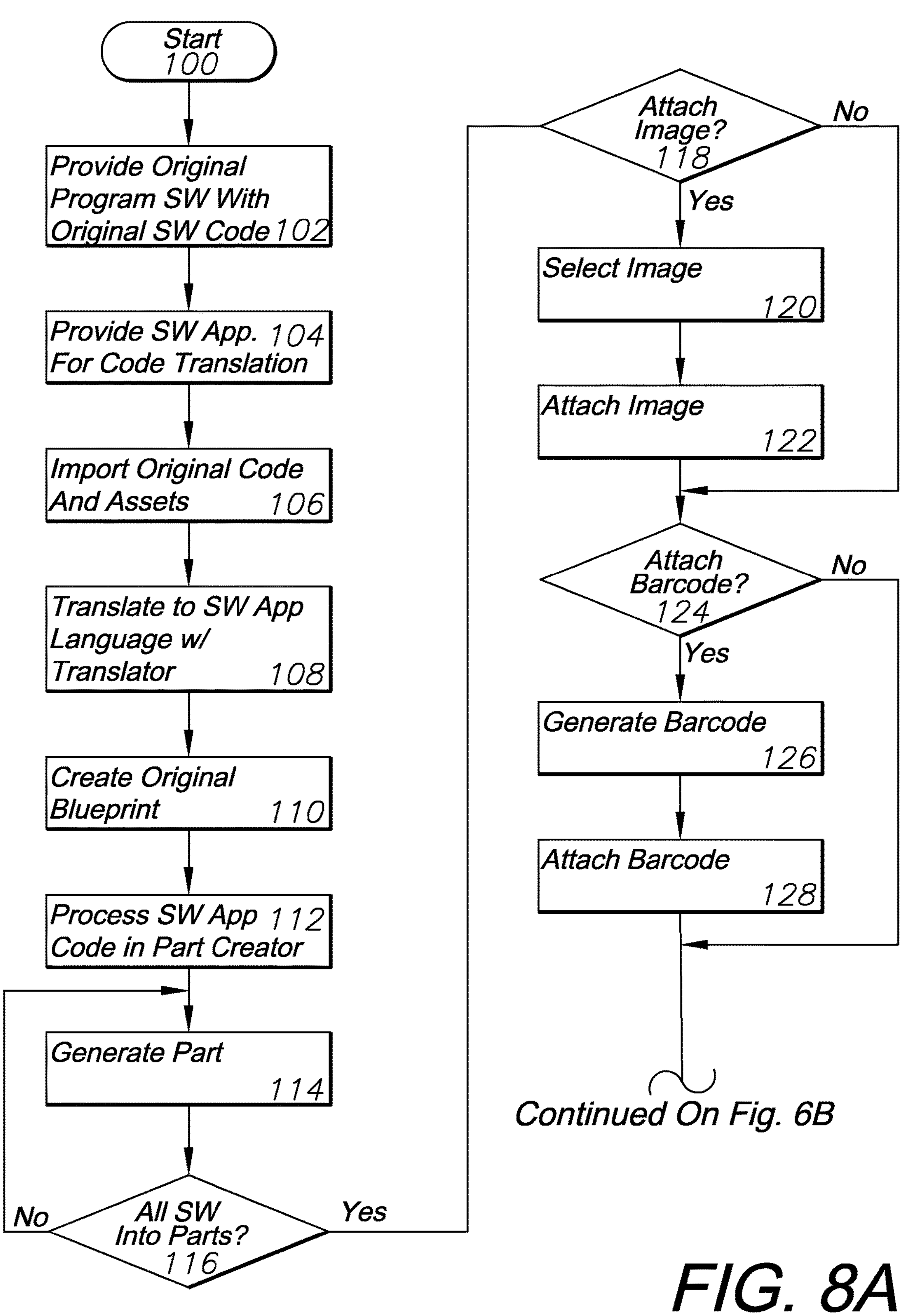
FIG. 8A is a flow chart diagramming the steps taken in practicing the embodiment thereof.
Figure 8B:
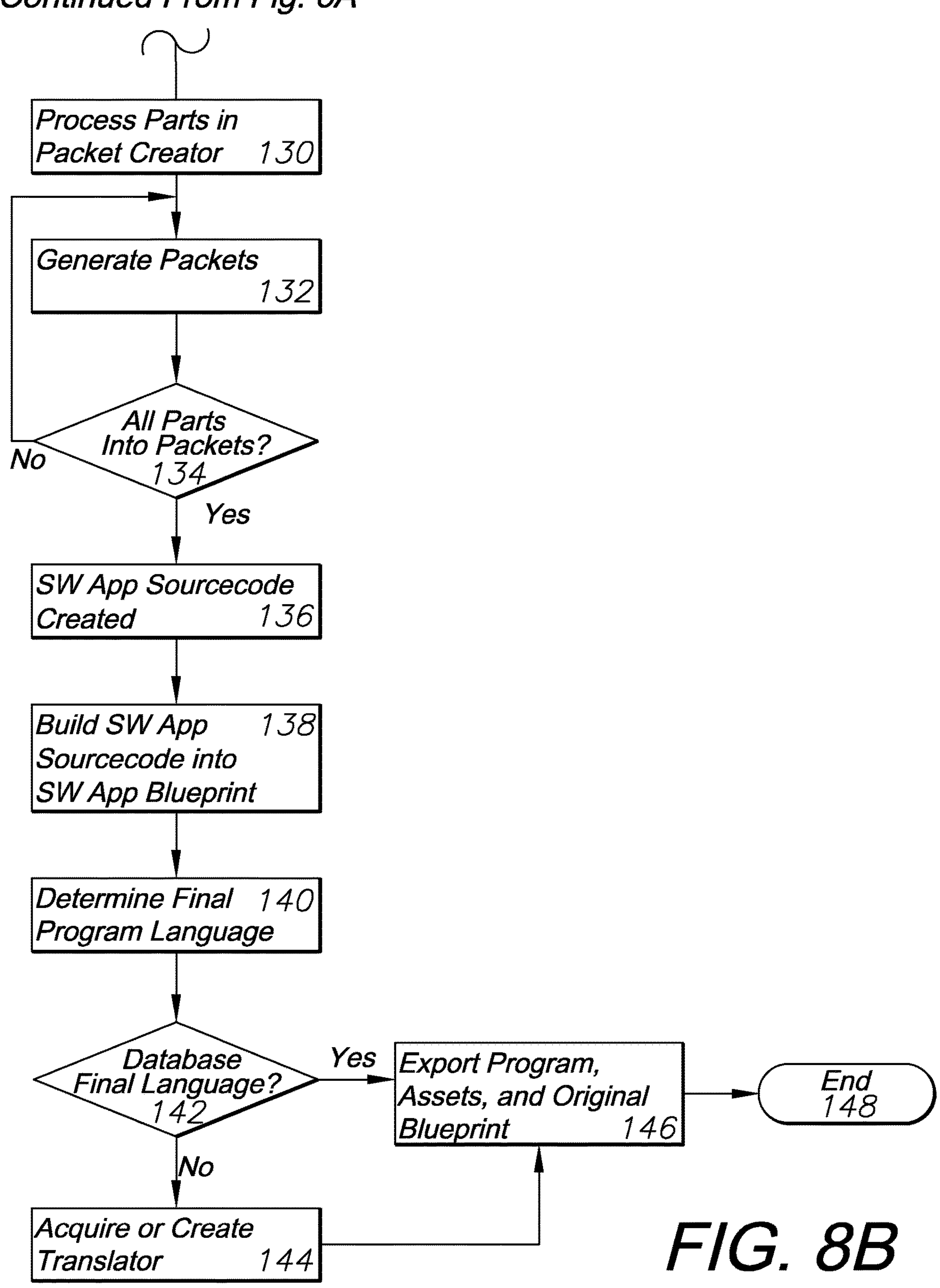
FIG. 8B is a flow chart continuing from FIG. 6A.

FIGS. 8A and 8B show a flowchart stepping through the elements used to practice an embodiment of the present invention. The process begins at 100 and then an original software program with original software program code is provided at 102. A software application for code translation is provided at 104, which would be the present visual programming language system 2 software application 12. The original source code and assets are imported at 106 into the software application 12.

The code is translated into the software application language 20 at 108, the original code blueprint is created from that at 110. The original code blueprint is created at 110, being frozen within the software program code as it is translated through the process. The translated code is then processed through the part creator 24 at 112. A part is generated at 114, and a check is made at 116 to determine if all parts have been made for a full translation of the software code. If yes, the process continues at 118 where the graphical content 18 or images can be attached. Otherwise, the process continues to generate parts at 114 until all parts are created and the check passes at 116.

If a decision to attach an image to a part is determined at 118, the image is selected by the user through the GUI at 120, and the image is attached to the part at 122. If the decision is not made to attach an image to a part, this is skipped.

Similarly, a decision can be made at 124 to attach a barcode to a part. If yes, the barcode is generated at 126 and attached at 128. Otherwise, these steps are skipped for a part.

Continued onto FIG. 8B, the system then processes the parts in the packet creator 25 where the parts 38 are combined into one or more packets 40 at 130. The parts are processed into the packets which are generated at 132, and a check is made at 134 whether all parts have been placed into packets. If no, packets continue to be generated at 132. Otherwise, the software application source code for the original program is created at 136. This is built into the software application blueprint 42 at 138. A final language is determined at 140, where the user determines what language, they want the original program to be translated into.

A check is determined at 142 whether the language database 17 includes the required translator for the final language. If not, the language translator is either created or acquired at 144, and then the program is exported into the final language 146, including the original assets and the frozen blueprint of the original source code in its original language 8. The process then ends at 148.

Figure 9:
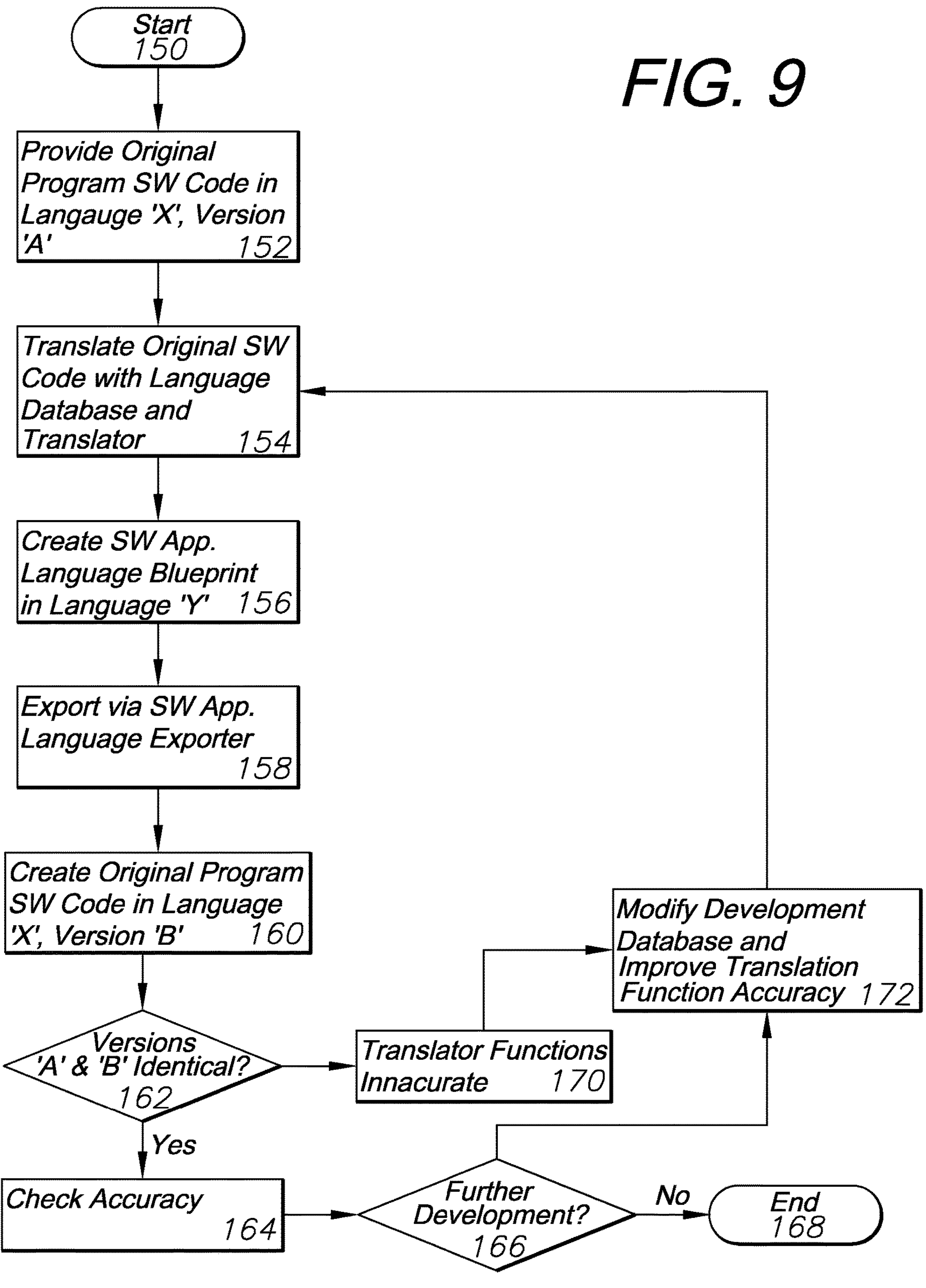
FIG. 9 is a flow chart diagramming the steps taken in practicing a translation element thereof.

FIG. 9 shows another flowchart stepping through the process of creating a new translator for translating into a new programming language. The process starts at 150 where an original program software code in a first language "X", version A, is provided 152. This is the software code from an original program, such as the original program 6 above. Next, the translator 16 and language database 17 are used to translate the original software code at 154. A software application language blueprint, which is stored in the software application language which is referred to as language "Y", distinct from Language "X", is created at 156 through the translator.

The software application language in language "Y" is exported via the language exporter at 158. An original program software code in language "X", version "B" is created from the translated language "Y" 160. A comparison is made at 162 to determine of Version "B" is identical to Version "A" This is to determine how the translation went.

If the two versions are identical at 162, a check for accuracy of the translation is also performed at 164. If no inaccuracies are detected, no further development is needed at 166 and the process ends at 168 with a new translator for language "X" having been created.

Alternatively, if the versions "A" and "B" are not found to be identical at 162, a determination of the translator function inaccuracies is made at 170 and modification of the language database and/or improvement of the translation function accuracy is provided at 172. Similarly, if accuracy issues are determined at 164 such that further development is required at 166, this modification step at 172 is taken. The process then goes back through the modified translator at 154 and repeats again. This iterative process continues until an accurate, identical translation is created between versions "A" and "B" of language "X," using software application language "Y" as the translation language in between.

The present invention could be referred to as a "visual coding environment engine". This allows the developer to focus on the environment vs the focus on the engine that drives the environment. The goal of the present invention is to remove the need of typing source code when programming. The invention uses language specific source code as input. It is converted into the new language. The new language is exported into language specific source code.

The developer retains the rights to source code used within the system and any/all environments created by the developer. The developers who build visual coding environments would be able to build environments that produced source code in office or gaming. An example would be a developer who built a gaming visual environment for programming which is powered by the present invention.

The present invention could be used in combination with a chat bot which works as an alternative visual environment for writing the software application language blueprint. The chat bot could be built on the AIML language specification and asks a series of questions that results in building a Blueprint. That Blueprint then can be converted to language specific source code by using the Toolkit Exporter process. The chat bot has the capability to learn and unlearn software application language 20 source code.

The present invention could use machine learning to build translators. This will allow the toolkit to build its rulesets based upon machine learning rather than a set of rules built through trial and error.

Because the software application language is a tag-based language that combines graphical content with written software language specific source code to produce a graphical representation of source code. Artificial intelligence would be capable of using the software application language to write source code in a similar manner as a visual environment.

The graphical elements 18 are an important part of the present invention. The toolkit adds graphical elements to the software language components within the Blueprint directly. A a two-dimensional graphical element is used to represent a piece of the software application language's tag-based source code. When combined, the result is a graphical component. The graphical element is also very general in representation, meaning it could be anything that a user wants a piece of source code to represent. Typically, that graphical component will be a two-dimensional graphic picture representing a piece of the software application language's tag-based language source code. Thus this graphical component consists of two items: a piece of the Software Application Language tag-based source code and the original language specific source code. Together these elements represent a Software Application Language tag-based source code component.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. An executable computer-operated visual programming software system, the system comprising:

a computing device comprising a central processing unit (CPU), data storage, a user input interface, and a display;

a software application configured to be executed, controlled and operated by said CPU;

an existing program stored within said data storage, said existing program comprising original program software code comprising a first language, and original program assets;

said software application comprising a software toolkit, a software application translator, a software application language comprising a second language, and a translator all configured to be stored within said dat5a storage;

an original program software blueprint created by said software application by said CPU;

said toolkit configured to transform said original program software code with said CPU into software application program code written in said second language;

said translator configured to communicate with and pull data from a language database stored within the data storage of the computing device such that said original program software code can be translated from said second language into a third language; and said software application further configured to export a new program comprising new program software code via said CPU, said original program assets, and said original software program blueprint, wherein said new program has new software code written in said third language and wherein said new program being independently executable via said CPU.

2. The system of claim 1, wherein said toolkit comprising a software application language editor configured for editing said second language.

3. The system of claim 1, further comprising:

said toolkit comprising a parts creator and a packet creator;

said software application program code comprising a plurality of software language components;

said parts creator configured to separate said software application program code into language parts by attaching an identifier to one or more of said plurality of software language components, thereby generating one or more said language parts; and said packet creator configured to create one or more software language packets from one or more of said language parts.

4. The system of claim 3, further comprising:

said toolkit comprising a software application language inventory;

said software application language inventory configured to organize said software language parts based upon said identifier; and said software application language inventory further configured to maintain and identify selected parts of said software application parts to be sent to packet creator for the creation of said one or more software application language packets.

5. The system of claim 3, further comprising an artificial intelligence configured to generate said language parts using an artificial intelligence knowledge base.

6. The method of claim 3, further comprising the steps:

providing an artificial intelligence and an artificial intelligence knowledge base; and generating said language parts using said artificial intelligence knowledge base.

7. A computer-implemented method of translating a software program from a first programming language into a second programming language, the method comprising the steps:

providing a computing device having a central processing unit (CPU), data storage, user input interface, and display;

providing a software application comprising a visual programming software system, said software application being stored within said data storage and being executable by said CPU;

providing an original program having an original software code being written in a first programming language, said original program further comprising original program assets;

executing said software application with said CPU;

processing said original program with said CPU via said software application;

translating said original software from said first language into a software application language;

creating an original program blueprint;

translating said original software from said software application language to a second programming language with said CPU via a translator of said software application, wherein said translator refers to a language database stored within said data storage; and exporting a translated program comprising said original software written in said second programming language, a copy of said original program blueprint, and said original assets, such that said translated program is independently executable via said CPU.

8. The method of claim 7, wherein said software application comprising a language editor configured for editing said software application language.

9. The method of claim 7, further comprising the steps:

providing a parts creator and a packet creator;

identifying a plurality of software language components within said original software;

separating said software application program code with said parts creator into language parts by attaching an identifier to one or more of said plurality of software language components, thereby generating one or more language parts; and creating one or more software language packets with said packet creator from one or more of said language parts.

10. The method of claim 9, further comprising the steps:

providing a software application language inventory;

organizing said software language parts based upon said identifier with said CPU via said software application language inventory; and maintaining and identifying selected parts of said software application parts to be sent to packet creator for the creation of said one or more software application language packets with said CPU via said software application language inventory.

* * * * *